United States Patent Office 3,383,644
Patented May 14, 1968

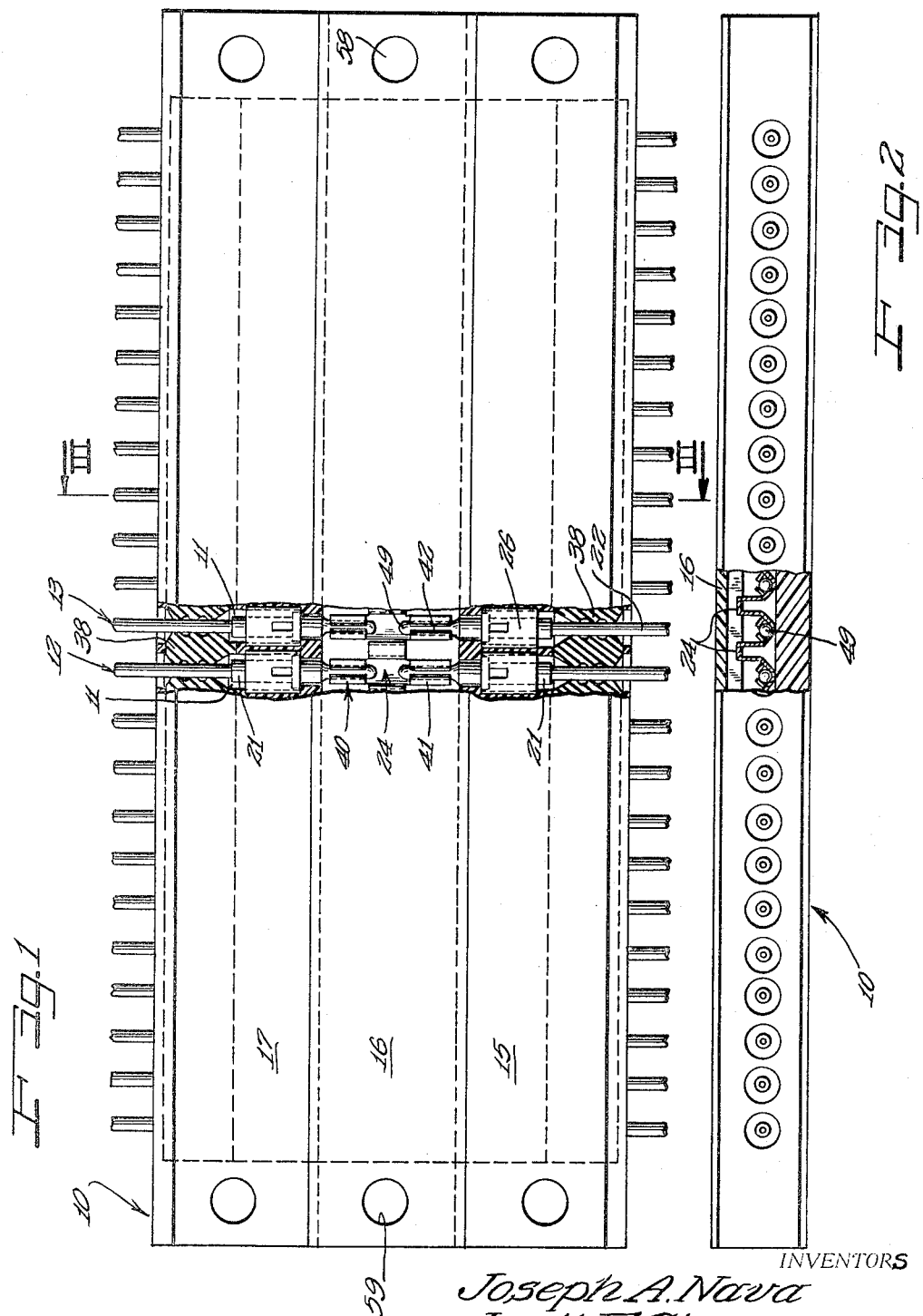

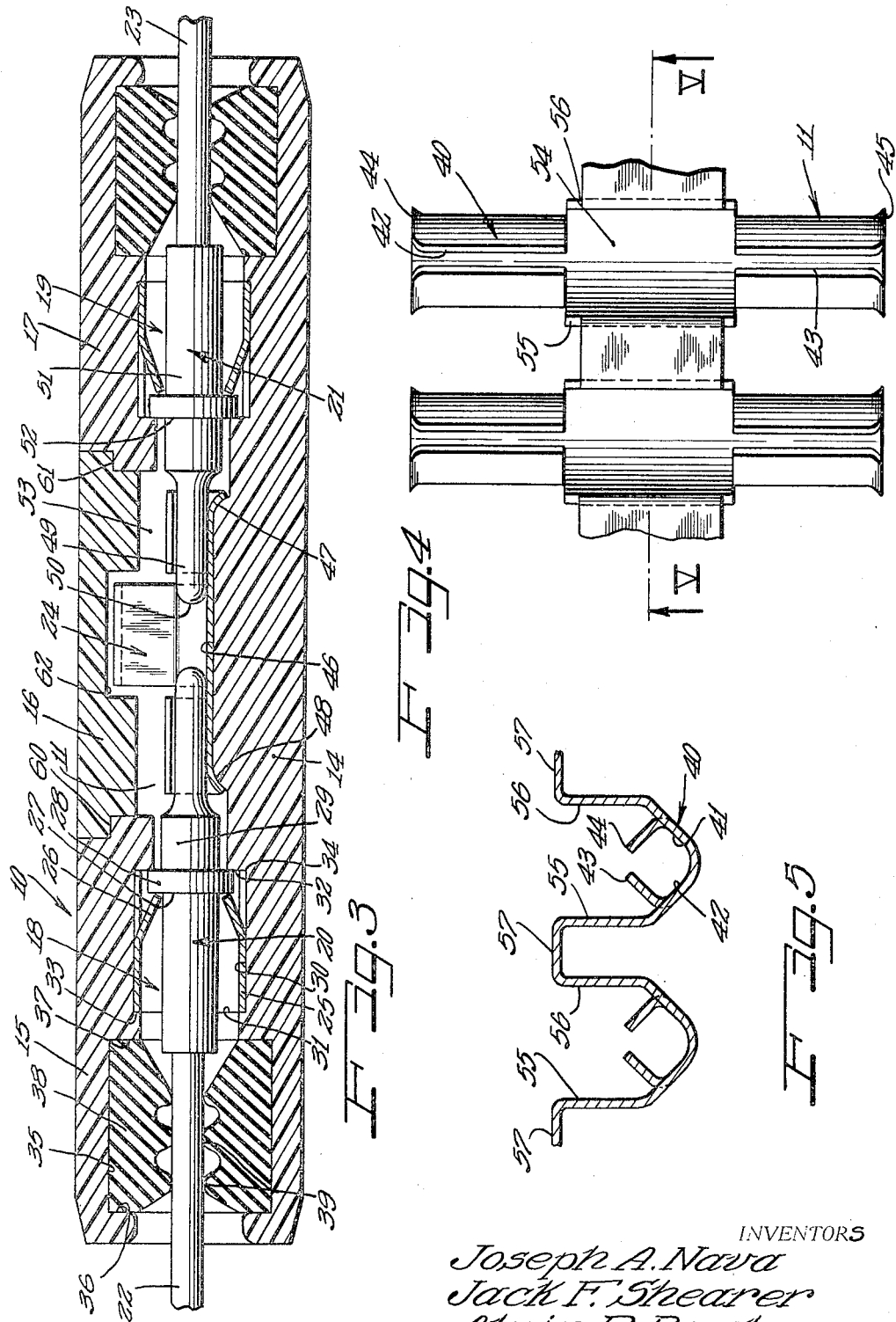

3,383,644
WIRE SPLICE
Joseph A. Nava, Villa Park, Jack F. Shearer, Lake Forest, and Alvin R. Burton, Northbrook, Ill., assignors to The Pyle-National Company, Chicago, Ill., a corporation of New Jersey
Continuation-in-part of applications Ser. No. 484,657, Sept. 2, 1965, and Ser. No. 524,382, Feb. 2, 1966. This application Aug. 1, 1966, Ser. No. 569,118
11 Claims. (Cl. 339—205)

ABSTRACT OF THE DISCLOSURE

A wire splicing unit having an insulating housing and a plurality of generally side-by-side hollow interior portions. Each of the hollow interior portions have an internal connector member for receiving a pair of wires to be spliced. Each of the internal connector members have a conductive loop connecting adjacent members and extending above the hollow interior portion and to the vicinity of an access opening formed transversely across a plurality of side-by-side hollow interior portions.

---

This application is a continuation-in-part of our copending applications Ser. No. 484,657, filed Sept. 2, 1965, and Ser. No. 524,382, filed Feb. 2, 1966.

This invention relates to quick operating wire splicing devices wherein wire ends are provided with external contacts and are detachably connected together in any combination. In particular, this invention relates to an internal splice contact having tubular contact portions and having a conductive loop for electrically connecting the tubular contact portions of adjacent splicing pairs.

This invention is particularly applicable where it is desirable to form a common splice between a multiplicity of wires without resorting to relatively expensive connectors and cumbersome interconnections, and where the splicing device can quickly connect and disconnect the wires.

The quick splicing device of the invention has many advantages since it operates successfully in an environment presenting shock, vibration and thermo-variations which tend to disrupt the cooperable electrical connections. Furthermore, the electrical systems in which such a splicing device is an integral part may require that the electrical circuit be not interrupted for even a small interval of time experienced through conditions such as vibration and shock.

In addition to the need for continuous electrical connection between the contacts of a wire splicing device, means must be provided to assure that the contacts remain clean of foreign materials prior to the use of the splicing device. Dust or other foreign particles collected at a wire splicing contact can readily disrupt or hinder the proper functioning of a sensitive electrical network.

Also it is highly desirable in many circumstances to provide a device having all of the above properties and also having a means for connecting a given splice pair with any given number of additional splice pairs wherein the connection between adjacent splice pairs may be readily separated by a user and wherein the entire system is nevertheless maintained dust free.

Therefore it is a principal object of this invention to provide a quick splice device which is suitable for being used under varying environmental circumstances.

It is also an object of this device to provide a wire splice device which employs a resilient tubular splicing member and which has means for connecting adjacent splicing pairs and for readily disconnecting such pairs without permanently exposing the splicing unit to dust, moisture, and other foreign particles.

It is another object of this invention to provide a readily detachable wire splice unit wherein adjacent splice pairs are connected by a conductive loop and wherein the splicing unit has an opening for allowing the user to readily sever the conductive loop to maintain electrical isolation of a chosen splice pair without interfering with the electrical combination of other spliced pairs.

It is a further object of this invention to provide a quick wire splice mechanism for splicing a single set or a plurality of sets of wire members wherein the unspliced contacts are maintained free of dust, moisture, and other foreign particles.

These and other objects, features and advantages of the present invention will be understood in greater detail from the following description and the associated drawings wherein reference numerals are utilized in designating an illustrative embodiment.

On the drawings:

FIGURE 1 is a partially sectioned view of a wire splicing unit according to this invention;

FIGURE 2 is an end view having a portion thereof sectioned for further illustrating the wire splicing unit as shown in FIGURE 1;

FIGURE 3 is a sectional view through the wire splicing unit of FIGURE 1 as taken along the lines III—III;

FIGURE 4 is an elevational view of a portion of the internal connector member of the wire splice device of this invention; and FIGURE 5 is a sectional view taken along the lines V—V of FIGURE 5.

As shown on the drawings:

The present invention contemplates a splicing device wherein the principles of construction may be utilized to provide a single splice between a single pair of wires, a common splice between a multiplicity of paired wires, or a multiplicity of single wire splices between corresponding paired wires. The splice of this invention is capable of withstanding shock, vibration and thermo-variations without breaking the electrical connection and is maintained free of foreign particles and moisture prior to and after the splicing operation.

This invention also provides a wire splicing unit which comprises a number of wire splicing sets disposed in generally side-by-side relationship and wherein the individual splicing sets are connected by a conductive loop in such a manner as to be readily severable by a user for electrically isolating one or a given number of splicing sets.

According to one aspect of this invention, an electrical connection is maintained between a pair of wires by three formed electrically conductive metal strips, two of which act to retain the wires in position within an insulating housing and a third of which happens to make the electrical connection between the wires. When a plurality of such strips are provided in a single housing, they can be bridged together to form a common splice between a number of wires, or the strips can be utilized as separate individual pieces to form multiple single wire splices. Also, if a conductive member is provided between adjacent connected portions of adjacent wire splicing devices, and if this kind of portion is formed in a suitable manner for being readily severed by a user, the wire splicing unit becomes an additionally effective and flexible splicing apparatus.

According to this invention, an insulating housing 10 has a plurality of generally hollow interior portions 11 formed in side-by-side relationship for splicing a number of wire pairs such as the pairs 12 and 13.

The insulating housing 10 has a base section 14 and three cover strips 15, 16 and 17. The cover strips 15, 16 and 17 are inter-fitted with the base 14 in such a manner as to completely enclose the generally hollow interior portions 11.

Three separate members are disclosed within the interior hollow section 11 for the purpose of making the indicated wire splice. In particular, two holder members such as the members 18 and 19 are disposed at opposite ends of the hollow interior portions 11 for gripping the contact ends 20 and 21 of a pair of wires 22 and 23. The third member is an internal connector 24 which is disposed intermediate the holder portions 18 and 19 and which is used to make electrical connection between the contact ends 20 and 21 of the wires 22 and 23. The holder portions 18 and 19 as shown in FIGURE 3, may be formed out of a flat metal strip in a manner generally similar to the technique described in our copending patent application, Ser. No. 524,382. In particular the flat metal strip may be rolled to have a generally cylindrical wall 25 from which a number of tines 26 may be bent inwardly thereof for the purpose of gripping an end surface 27 of a collet 28 formed about a cylindrical wall 29 of the end contact member 20.

The base 14 of the insulating housing 10 is provided with a recess 30 which has end faces 31 and 32. The holder portion 18, for instance, is fitted within the recess 30 and the ends 33 and 34 of the holder portion 18 are fitted between the end faces 31 and 32 of the recess 30. In this way, the holder portion 18 is locked into position axially within the generally hollow interior 11 and provides thereby a suitable means for securely positioning the contact end 20 of the wire 22 within the insulating housing 10.

The holder portion 19 which is associated with the contact end 21 of the wire 23 is formed similarly with the holder portion 18 and is similarly disposed within associated features of the insulating housing 10. Accordingly, reference numerals utilized to describe the cooperation of the end contact 20 with the insulating housing 10 have been carried forward to the similar features associated with the contact end 21 of the wire 23.

The insulating cover 10 has opened end sections 35 characterized by inwardly extending end walls 36 and 37 for receiving a molded rubber end seal 38. The rubber seal 38 is provided with a series of grip surfaces 39 for providing a dust free seal with the external pin connector or end contact 20. As described in my copending patent application Ser. No. 524,382, the end seals 38 may be formed to completely enclose the opened end sections 35 of the housing 10, even when the pin connector or contact end 20 is not positioned within the hollow interior 11. This feature may be of importance particularly to the type of insulating housing 10 shown in FIGURE 1. The housing 10 has a plurality of hollow interior portions 11, some of which may not at any one time be in use. However, each hollow interior portion is in communication with other hollow interior portions, and accordingly dust, moisture or other foreign matter would be allowed to circulate throughout the system if any of the opened end sections were exposed to the atmosphere.

The internal connector member 24 which is disposed within the hollow interior 11 and fitted between the holder portions 18 and 19 may also be formed from a flat sheet according to the technique described in our copending application, Ser. No. 524,382. In particular, a flat sheet may be cut along specified lines and rolled to form the generally cylindrical configuration of the internal connector 24.

The connector 24 is the element which is utilized to make the electrical contact between the wires to be spliced, and for this purpose, the member 24 is provided to have a specified amount of resiliency. Resilience in the electrical connector member is desirable if a firm contact is to be made with the wires being spliced. Resiliency in the contact members is especially important if the splicing system is to experience variations in temperature, vibration or shock or the like. In many circumstances, for instance, it may be highly important not to lose electrical contact between a pair of spliced wires even for a micro-second or less. Accordingly, the contact members 24 are designed to maintain a uniform electrical contact between the contact ends 20 and 21 of the wires 22 and 23 to be spliced.

The internal connector member 24 is provided generally with tubular end portions 40 and 41 for receiving the contact ends 20 and 21 of the splicing wires 22 and 23. The tubular end portions 40 and 41 are split longitudinally as at 42 and 43 to give added resiliency to the electrical connection to be made between the wires 22 and 23. Also, the tubular end portions 40 and 41 have flared end sections 44 and 45 to allow the insertion of a pin therein which pin has an outside diameter greater than the inside diameter of the tubular portions 40 and 41. This combination of the larger diameter pin and smaller diameter tubular portions along with the flared end sections 44 and 45 as well as with the longitudinal split 42 and 43 provides a resilient contact between the wires 22 and 23.

As shown in FIGURE 3, the base portion 14 of the insulating housing 10 has a surface 46 formed intermediate the end recess 30 for receiving the internal connector 24. The surface 46 also has contoured edges 47 and 48 which are mated to the flared ends 44 and 45 of the tubular end portions 40 and 41. Due to this mating relationship between the internal connector 24 and the contoured surface 46, axial movement of the connector 24 is resisted during the insertion of the end contacts 20 and 21 within the tubular end portions 40 and 41.

The pin connectors or end contacts 20 and 21 associated with the wires 22 and 23 are shown in FIGURE 3 positioned within the hollow interior 11. Generally, the pin connector consists of a standardized cylindrical contact 49 having a rounded head 50, shank portion 51 and a shoulder 52 which is formed at the collet 28. The shank portion 51 is fixedly secured in a well understood manner to the associated wire or cable 23. The contact 35 is positioned interiorly of the tubular end portion 40 and is firmly gripped therein due to the resilient nature of the tubular portion 40 and due to the larger size of the cylindrical contact member 49.

As shown in FIGURE 5, a firm contact between the tubular portion 40, for instance, and the cylindrical contact 49 is further accomplished by the nature of the cross-sectional configuration of the tubular portion 40. In particular, the tubular portion 40 has a generally rectangular cross-section which comprises generally plane surfaces 41, 42, 43 and 44 for contacting the cylindrically shaped pin 49. By so forming the tubular portion 40, the contact area between the tubular portion and the pin 49 is reduced, and the result is an increase in contact pressure at the pin 49 which would not be present with the use of a cylindrically formed member in place of the tubular portion 40 as shown in FIGURE 5.

The shank portion 51 of the pin connector is disposed axially within the hollow interior 11, and the shoulder 52 is locked against the end wall 32 of the housing 10 due to the presence of the tines 26 which are positioned against the surface 27 of the collet 28. Therefore, while the continuity of the electrical contact is provided by the tubular portions 40 and 41 of the internal connector member 24, the axial mobility of the pin connector is provided by the shoulder 52 in combination with the oppositely orientated tines 26. During insertion of the pin connector within the hollow interior 11, the shoulder 52 easily spreads the tines 26 outwardly from the position shown in FIGURE 3 for acquiring the locked position shown between those tines and the wall 32.

In various electrical uses, it may not only be desirable to splice the wire 22 to the wire 23, but it may also be desirable to join a number of sets of spliced wires together. On the other hand, it may be also desirable to select from a number of available choices which wires are to be electrically joined and which wires to be electrically isolated from the remaining wires in a given wire splicing unit. For this purpose, the wire splicing unit shown in FIGURE 1 is provided with a means for readily choosing which of a number of wires within the unit are to be electrically joined together and which of those wires are to be eletcrically isolated.

The wire splicing unit of FIGURE 1 is provided with a slot or opening 53 which is formed generally transversely of the hollow interior portions 11 of the housing 10. The opening 53 cuts across the hollow interior portions 11 in the vicinity of the internal connector 24 and thereby communicates each of the hollow interior portions 11 with each other hollow interior portion. This communication between the hollow interior portions 11 then allows the positioning of a conductive member along the length of the opening 53 to interconnect each of the internal connector members 24.

For the purpose of interconnecting adjacent internal connector members 24 and for providing that the connection will be readily severable at the will of the user, a central portion 54 of the internal connector 24 is provided with side walls 55 and 56 which extend in a generally perpendicular direction to the transverse opening 53. An end wall 57 then interconnects side walls 55 and 56 of the adjacent internal connectors 24. Hence, the combination of the side walls 55 and 56 along with the end wall 57 forms a continuous electrical connection between each one of the wire splicing devices which comprise the wire splicing unit as shown in FIGURE 1.

The combination of the side walls 55 and 56 and the end wall 57 may be said to comprise a conductive loop which is disposed in such a way as to have the end wall 57 removed from the vicinity of the tubular end portions 40 and 41 and orientated in such a manner as to be readily severable by a user. For instance, the end wall 57 is spaced upwardly within the opening 53 such that a user may readily sever the end wall 57 to electrically isolate one or more of the wire splicing sets. To this end, the perpendicularity of the side walls 55 and 56 assure that sufficient space will be provided between those walls to allow the insertion of a cutter or the like to sever the end wall 57.

To sever one or several of the end walls 57 which interconnect the internal connectors 24, the central section 16 of the housing 10 may be readily removed by loosening two fasteners 58 and 59 which are disposed at opposite ends of the section 16. In this way, the central section 16 takes the form of a cover or strip which is readily removable but which is tightly secured to the housing 10 to prevent the entry of dust, moisture or other foreign matter into the hollow interior portions 11. The central section or cover 16 may be inter-fitted as at 60 and 61 in a well understood manner and may be provided with a recessed region 62 to allow the side walls 55 and 56 of the internal connections 24 to extend adequately away from the vicinity of the tubular end portions 40 and 41 for being readily and easily severable by a user.

It will be understood that various modifications of the embodiment disclosed herein may be accomplished by those versed in the art, but we desire to claim all such embodiments as properly come within the scope and spirit of our contribution to the art.

We claim as our invention:

1. A wire splice assembly comprising,
an insulator cover having an axial through opening comprising a central bore, a collet cavity axially inwardly of each respective end of said bore and a sealing cavity axially outwardly of each respective collet cavity and opening out of a corresponding end of said cover,
a current continuing spring member in said central bore comprising a body and retainer portion for engagement with an adjoining portion of said cover and a pair of oppositely extending socket portions for receiving a pin contact of a pin connector inserted thereinto,
a collet in each collet cavity having inwardly directed tines for engaging the adjoining shoulder of a corresponding pin connector inserted thereinto,
thereby preventing axial displacement of the pin connector in the splice assembly,
and a corrugated rubber seal ring in each sealing cavity for sealably engaging an inwardly adjoining peripheral surface.

2. A wire splice assembly as defined in claim 1 and further characterized by
said assembly being constructed to provide plural wire splicing sets in side-by-side relation,
said insulator cover having plural through openings formed therein,
said current continuing member having a common body and retainer portion and plural separate pairs of socket portions.

3. A wire splice assembly as defined in claim 2 and further characterized by said insulator cover having a removable portion in register with said current continuing member and affording access thereto so a user may selectively cut said body and retainer portion to isolate cavities which are not required to be electrically interconnected.

4. A wire splicing unit comprising:
an insulating housing having a plurality of generally side-by-side hollow interior portions,
internal connector members positioned within each of said hollow interior portions,
said internal connector members having means for firmly contacting the ends of a pair of wires,
said insulating housing having an access opening formed transversely thereof and cutting across a plurality of the side-by-side hollow interior portions in the vicinity of said internal connector members,
said internal connector members being generally spaced away from said access opening and having a severable loop interconnecting adjacent connector members and extending from said connector member toward said access opening, and
means for detachably and sealably closing said opening to said insulating housing.

5. A wire splicing device in accordance with claim 1 wherein said spring member comprises:
an electrically conductive member having tubular contact portions formed at opposite ends thereof,
said tubular contact portions being split longitudinally for allowing the resilient insertion and holding of a contact end of a wire having an outside diameter greater than the inside diameter of the tubular portions.

6. A wire splicing device in accordance with claim 5 wherein said tubular contact portions have a generally rectangular cross-section and have outwardly flared end portions, whereby internal wire contacts may be firmly spliced within said tubular contact portions.

7. A wire splicing unit comprising:
an insulating housing having a plurality of generally side-by-side hollow interior portions,
internal holder members and a connector member positioned within each of said hollow interior portions,
said internal holder members being disposed at opposite ends of an associated hollow interior portion and being electrically separated from said connector member and having gripping portions for detachably engaging the contact ends of a pair of wires,
said internal connector member being disposed intermediate said holder members and having means for firmly contacting the ends of a pair of wires,
said insulating housing having an access opening formed transversely thereof and cutting across a plurality of the side-by-side hollow interior portions in the vicinity of said internal connector members, thereby communicating each of said hollow interior portions with each other of said hollow interior portions, said internal connector members being readily and separately connected together by a conductive member disposed along the length of and within said opening, and means for detachably and sealably closing said opening to said insulating housing.

8. A wire splicing unit in accordance with claim 7 wherein said internal connector member has first and second tubular end portions, said tubular end portions being split longitudinally for allowing the resilient insertion and holding of a contact end of a wire having a diameter greater than the diameter of the tubular portion.

9. A wire splicing unit in accordance with claim 8 wherein the cross-section of said tubular end portion has a generally rectangular form for firmly engaging the contact ends of a pair of wires.

10. A wire splicing unit in accordance with claim 8 wherein said internal connector member has a conductive loop having a surface extending from the tubular end portions into the vicinity of said opening for being readily separable to electrically separate adjacent internal connector members.

11. A wire splicing unit in accordance with claim 10 wherein said conductive loop is formed intermediate the tubular end portions and wherein said loop has side walls extending generally perpendicular to the longitudinal axis of said opening and an end wall formed generally parallel to the longitudinal axis of said opening, and wherein said end wall interconnects the side walls of adjacent internal connectors.

References Cited

UNITED STATES PATENTS

| | | | |
|---|---|---|---|
| 2,158,004 | 5/1939 | Douglas | 339—204 |
| 2,175,251 | 10/1939 | Carson | 339—205 |
| 2,396,725 | 3/1946 | Thomas | 339—205 |
| 2,431,583 | 11/1947 | Penfold | 339—205 |
| 2,463,826 | 3/1949 | Thacker | 339—217 |
| 2,703,395 | 3/1955 | Long | 339—205 |
| 2,758,291 | 8/1956 | Richards | 339—205 |
| 2,935,720 | 5/1960 | Lorimer | 339—205 |
| 3,107,964 | 10/1963 | Wolf | 339—205 |
| 3,158,424 | 11/1964 | Bowen | 339—217 |
| 3,206,717 | 9/1965 | Brown et al. | 339—205 |
| 3,263,205 | 7/1966 | Chandler | 339—205 |

RICHARD E. MOORE, *Primary Examiner.*

R. S. STROBEL, *Assistant Examiner.*